(12) United States Patent
Byiringiro et al.

(10) Patent No.: US 11,861,692 B2
(45) Date of Patent: Jan. 2, 2024

(54) AUTOMATED HYBRID PIPELINE FOR CUSTOMER IDENTIFICATION

(71) Applicant: SAP SE, Walldorf (DE)

(72) Inventors: Auguste Byiringiro, Singapore (SG); Jiatai Qiang, Singapore (SG); Atreya Biswas, Singapore (SG); Sean Saito, Singapore (SG)

(73) Assignee: SAP SE, Walldorf (DE)

( * ) Notice: Subject to any disclaimer, the term of this patent is extended or adjusted under 35 U.S.C. 154(b) by 1195 days.

(21) Appl. No.: 16/430,674

(22) Filed: Jun. 4, 2019

(65) Prior Publication Data

US 2020/0387963 A1 Dec. 10, 2020

(51) Int. Cl.
*G06Q 40/02* (2023.01)
*G06N 3/08* (2023.01)
*G06Q 40/12* (2023.01)
*G06N 3/045* (2023.01)
*G06F 16/22* (2019.01)

(52) U.S. Cl.
CPC ............ *G06Q 40/02* (2013.01); *G06N 3/045* (2023.01); *G06N 3/08* (2013.01); *G06Q 40/12* (2013.12); *G06F 16/2282* (2019.01)

(58) Field of Classification Search
None
See application file for complete search history.

(56) References Cited

U.S. PATENT DOCUMENTS

| | | | |
|---|---|---|---|
| 6,760,746 B1 * | 7/2004 | Schneider | H04L 67/60 709/217 |
| 6,901,436 B1 * | 5/2005 | Schneider | H04L 61/30 709/219 |
| 7,188,138 B1 * | 3/2007 | Schneider | G06Q 30/02 709/224 |
| 7,194,552 B1 * | 3/2007 | Schneider | H04L 61/3015 709/217 |
| 8,143,217 B2 * | 3/2012 | Balkan | A61P 43/00 514/6.9 |
| 8,370,257 B2 * | 2/2013 | Tabuchi | G07F 19/20 705/28 |
| 9,495,652 B1 * | 11/2016 | Cook | G06Q 10/00 |

(Continued)

OTHER PUBLICATIONS

U.S. Appl. No. 16/186,784, Saito et al., "Platform for Preventing Adversarial Attacks on Image-Based Machine Learning Models," filed Nov. 12, 2018, 31 pages.

(Continued)

*Primary Examiner* — Fateh M Obaid
(74) *Attorney, Agent, or Firm* — Fish & Richardson P.C.

(57) ABSTRACT

Methods, systems, and computer-readable storage media for receiving a first bank statement at a hybrid pipeline including a set of lookup tables and a deep learning (DL) model that can each be used to determine customer IDs from bank statements, providing a first key based on data associated with the first bank statement, and determining that the first key is included in a first lookup table of the set of lookup tables, and in response: identifying a first set of customer IDs from the first lookup table, the first set of customer IDs including one or more customer IDs, and outputting the first set of customer IDs to computer-executable software that matches the first bank statement to one or more electronic documents at least partially based on the first set of customer IDs.

20 Claims, 6 Drawing Sheets

(56) References Cited

U.S. PATENT DOCUMENTS

| | | | | |
|---|---|---|---|---|
| 10,114,814 | B1* | 10/2018 | Robertson | G06F 16/313 |
| 10,331,950 | B1* | 6/2019 | Suriyanarayanan | G06F 40/295 |
| 10,684,738 | B1* | 6/2020 | Sicora | G06F 16/435 |
| 10,685,004 | B2* | 6/2020 | Xiu | G06N 20/00 |
| 10,706,477 | B1* | 7/2020 | Le Chevalier | G06V 40/1365 |
| 11,170,172 | B1* | 11/2021 | Robertson | G06F 16/61 |
| 2002/0107062 | A1* | 8/2002 | Wong | A63F 13/00 463/9 |
| 2002/0156866 | A1* | 10/2002 | Schneider | H04L 61/3025 707/E17.112 |
| 2004/0230534 | A1* | 11/2004 | McGough | G06Q 20/382 705/64 |
| 2006/0020812 | A1* | 1/2006 | Steinberg | H04L 63/1483 713/181 |
| 2006/0090073 | A1* | 4/2006 | Steinberg | H04L 63/168 713/170 |
| 2008/0005127 | A1* | 1/2008 | Schneider | H04L 61/30 |
| 2008/0120155 | A1* | 5/2008 | Pliha | G06Q 20/105 705/14.17 |
| 2009/0018934 | A1* | 1/2009 | Peng | G06Q 30/02 705/30 |
| 2015/0161375 | A1* | 6/2015 | Ghosh | G06F 21/36 726/7 |
| 2016/0307071 | A1* | 10/2016 | Perronnin | G06V 10/82 |
| 2017/0193834 | A1* | 7/2017 | Maharaj | G09B 7/00 |
| 2017/0255888 | A1* | 9/2017 | McCord | G06N 7/005 |
| 2018/0024919 | A1* | 1/2018 | Geml | G06F 3/061 711/103 |
| 2018/0025436 | A1* | 1/2018 | Déjean | G06V 10/44 382/195 |
| 2018/0219919 | A1* | 8/2018 | Crabtree | H04L 63/20 |
| 2019/0066064 | A1* | 2/2019 | Liu | G06Q 20/209 |
| 2019/0087731 | A1* | 3/2019 | Hull | G06Q 10/067 |
| 2019/0087756 | A1* | 3/2019 | Hull | G06Q 10/06316 |
| 2019/0095736 | A1* | 3/2019 | Stahlfeld | G11B 27/10 |
| 2019/0121956 | A1* | 4/2019 | Turgeman | G06F 21/316 |
| 2019/0156506 | A1* | 5/2019 | Fisher | H04W 4/33 |
| 2020/0053121 | A1* | 2/2020 | Wilcox | G06F 40/205 |
| 2020/0151505 | A1* | 5/2020 | Saito | G06V 10/82 |
| 2020/0167784 | A1* | 5/2020 | Kursun | G06Q 20/4016 |
| 2020/0167785 | A1* | 5/2020 | Kursun | H04L 43/045 |
| 2020/0167786 | A1* | 5/2020 | Kursun | H04L 63/08 |
| 2020/0169483 | A1* | 5/2020 | Kursun | G06Q 20/3678 |
| 2020/0175559 | A1* | 6/2020 | Saito | G06F 16/2456 |
| 2020/0184281 | A1* | 6/2020 | Le | G06N 20/20 |
| 2020/0193511 | A1* | 6/2020 | Saito | G06N 3/08 |
| 2020/0293623 | A1* | 9/2020 | Saito | G06N 3/0445 |

OTHER PUBLICATIONS

U.S. Appl. No. 16/208,681, Saito et al., "Representing Sets of Entitites for Matching Problems," filed Dec. 4, 2018, 29 pages.

U.S. Appl. No. 16/210,070, Le et al., "Graphical Approach to Multi-Matching," filed Dec. 5, 2018, 31 pages.

U.S. Appl. No. 16/217,148, Saito et al., "Utilizing Embeddings for Efficient Matching of Entities," filed Dec. 12, 2018, 29 pages.

U.S. Appl. No. 16/352,981, Saito, "A Learning System for Contextual Interpretation of Japanese Words," filed Mar. 14, 2019, 26 pages.

Vaswani et al., "Attention is All You Need," Advances in neural information processing systems, Jun. 2017, 11 pages.

* cited by examiner

AUTOMATED HYBRID PIPELINE FOR CUSTOMER IDENTIFICATION

BACKGROUND

Enterprises use software systems in order to conduct their operations. Example operations can include accounting operations. In some examples, a user can interact with the software system to perform tasks manually, while other tasks are performed automatically by the software system. In some instances, the output of a software system is not always trustworthy. For example, software systems can be tasked with matching electronic documents (e.g., matching banks statement to invoices). However, instances can occur where a confidence level of the match provided by the software system is too small to be trusted, and a manual intervention is impractical or very difficult.

SUMMARY

Implementations of the present disclosure are directed to a platform for predicting a customer identifier (ID) (also referred to as a receivable account ID) from a computer-readable bank statement (e.g., a computer-readable file storing data representative of a bank statement). More particularly, implementations of the present disclosure are directed to a hybrid pipeline that includes lookup tables and a deep learning (DL) model that are used to predict the customer ID from the bank statement.

In some implementations, actions include receiving a first bank statement at a hybrid pipeline including a set of lookup tables and a deep learning (DL) model that can each be used to determine customer IDs from bank statements, providing a first key based on data associated with the first bank statement, and determining that the first key is included in a first lookup table of the set of lookup tables, and in response: identifying a first set of customer IDs from the first lookup table, the first set of customer IDs including one or more customer IDs, and outputting the first set of customer IDs to computer-executable software that matches the first bank statement to one or more electronic documents at least partially based on the first set of customer IDs. Other implementations of this aspect include corresponding systems, apparatus, and computer programs, configured to perform the actions of the methods, encoded on computer storage devices.

These and other implementations can each optionally include one or more of the following features: the first key is compared to values of the first lookup table in response to determining that a value of the first key is valid; the first key includes a payment advice account (PAA) value, and the first lookup table comprises a PAA lookup table that records PAA value and set of customer IDs pairs; actions further include: receiving a second bank statement at the hybrid pipeline, providing a second key based on data associated with the second bank statement, and determining that the second key is included in a second lookup table of the set of lookup tables, and in response identifying a second set of customer IDs from the second lookup table, the second set of customer IDs including one or more customer IDs, and outputting the second set of customer IDs to the computer-executable software that matches the second bank statement to one or more electronic documents at least partially based on the second set of customer IDs; the second key is provided in response to determining that a key that is provided based on data associated with the second bank statement is one of invalid and absent from the first lookup table; actions further include: receiving a second bank statement at the hybrid pipeline, processing a memoline of the second bank statement using the DL model to provide a second set of customer IDs, the second set of customer IDs including one or more customer IDs, and outputting the second set of customer IDs to the computer-executable software that matches the second bank statement to one or more electronic documents at least partially based on the second set of customer IDs; and the memoline of the second bank statement is processed by the DL model in response to determining that customer IDs for the second bank statement cannot be determined from any lookup tables in the set of lookup tables.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a platform for predicting a customer identifier (ID) (also referred to as a receivable account ID) from a computer-readable bank statement (e.g., a computer-readable file storing data representative of a bank statement). More particularly, implementations of the present disclosure are directed to a hybrid pipeline that includes lookup tables and a deep learning (DL) model that are used to predict the customer ID from the bank statement. Implementations can include actions of receiving a bank statement at a hybrid pipeline including a set of lookup tables and a deep learning (DL) model that can each be used to determine customer IDs from bank statements, providing a key based on data associated with the first bank statement, and determining that the key is included in a lookup table of the set of lookup tables, and in response: identifying a set of customer IDs from the lookup table, the set of customer IDs including one or more customer IDs, and outputting the set of customer IDs to computer-executable software that matches the bank statement to one or more electronic documents at least partially based on the set of customer IDs.

To provide further context for implementations of the present disclosure, and as introduced above, enterprises use software systems in order to conduct their operations. Example operations can include accounting operations. In this example context, an example software system includes SAP Cash Application provided by SAP SE of Walldorf, Germany. In some examples, a user can interact with the software system to perform tasks manually, while other tasks are performed automatically by the software system. In the context of accounting operations, incoming payments can be considered. For example, each time an enterprise engages with a customer, an invoice is generated and is provided to the customer for remittance. The customer is expected to pay the invoice amount before a certain due date. As long as the payment has not been made, the invoice is still considered open. Enterprises engage with multiple clients over multiple instances and in different volumes each year. Consequently, at any given time, there is potentially a high number of open invoices. When a payment is made by a customer, the enterprise receives a bank statement. Among all open invoices, an invoice or a set of invoices that correspond to the bank statement need to be identified in order to be able to close the invoices.

In general, to close invoices, each invoice needs to be matched to a bank statement. This process of matching banks statements to invoices is referred to as line item matching (LIM). In some instances, a computer-executable program can be used to automate LIM. However, instances can occur where a confidence level of the computer-executable program is too small to be trusted, and a manual intervention is impractical or very difficult.

In view of the above context, implementations of the present disclosure provide a platform for predicting a customer ID (also referred to as a receivable account ID) from a computer-readable bank statement (e.g., a computer-readable file storing data representative of a bank statement). More particularly, implementations of the present disclosure are directed to a hybrid pipeline that includes lookup tables and a deep learning (DL) model that are used to predict the customer ID from the bank statement alone. Accordingly, and as described in further detail herein, implementations of the present disclosure provide a technical solution to inherent shortcomings of traditional software systems, particularly in instances where a confidence level of the software system is too small to be trusted, and a manual intervention is impractical or very difficult.

Figure 1:
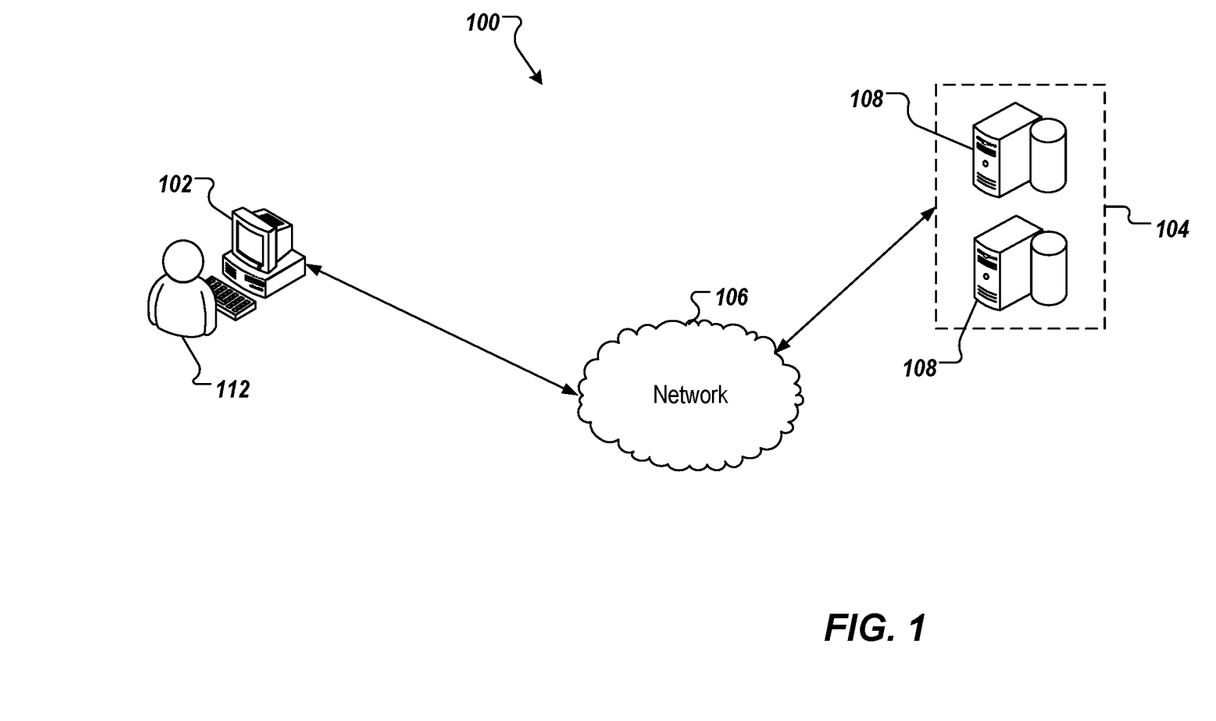
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host the hybrid pipeline that includes lookup tables and a DL model that are used to predict one or more customer IDs from the bank statement. For example, the server system 104 can receive one or more bank statements, each bank statement being provided as a computer-readable file, and can process the bank statements through the hybrid pipeline of the present disclosure to determine one or more customer IDs within each bank statement. In some examples, the customer IDs are used to further process the banks statements and one or more invoices for matching banks statements to invoices (LIM).

In some implementations, and as described in further detail herein, a payment advice account (PAA) field of the bank statement is used to determine the customer ID. More particularly, each bank statement includes multiple fields. Example fields can include, without limitation, an amount field, a name field, a date field, and a PAA field. However, not all fields are helpful for determining the customer ID. For example, on its face, the amount field provides no indication of the customer ID. As another example, although the name field may include information representative of the customer, or an entity related to the customer (e.g., a subsidiary), the customer ID cannot be directly determined from the name field. However, the PAA field provides information that the hybrid pipeline of the present disclosure can leverage to determine the customer ID.

Figure 2:
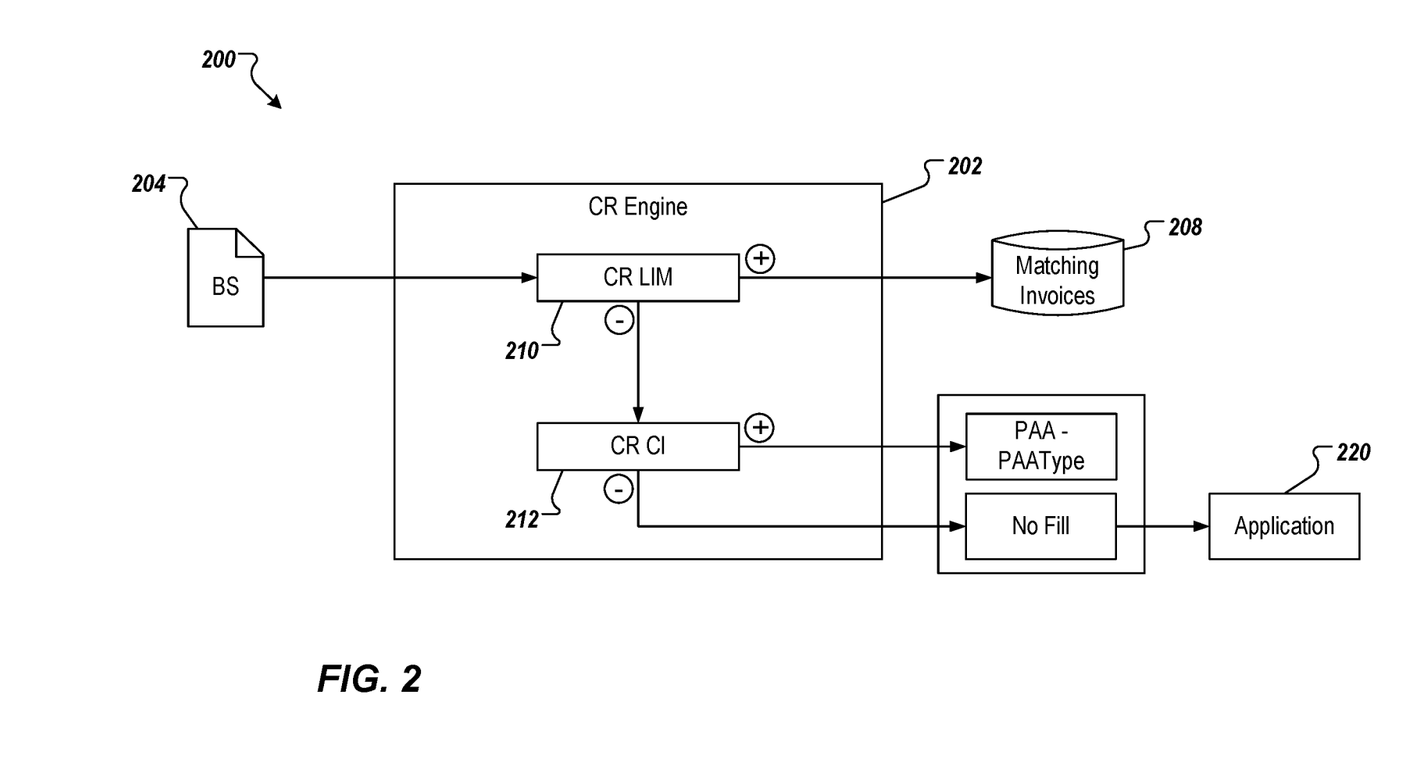
FIG. 2 depicts an example conceptual architecture in accordance with implementations of the present disclosure.

FIG. 2 depicts an example conceptual architecture 200 in accordance with implementations of the present disclosure. In the depicted example, a classic rule (CR) engine 202 processes a bank statement (BS) 204. As described in further detail herein, in some instances, the CR engine 202 can either directly match the BS 204 to one or more invoices and store the match in a matching invoices repository 208 to subsequently clear matched invoices. In some instances, however, the CR engine 202 cannot directly match the BS 204 to an invoice, and further processes the BS 204 as described herein.

In further detail, the CR engine 202 includes a CR LIM module 210 and a CR customer ID (CI) module 212. In some examples, the CR LIM module 210 matches bank statements and invoices based on some deterministic rules mimicking what a human accountant would manually do. If the CR LIM module 210 is unable to match the BS 204 to at least one invoice, the CR CI module 212 attempts to predict one or more customer IDs based on other deterministic rules. If the CR CI module 212 is able to predict a customer ID, the value predicted as the customer ID is directly used to fill in a PAA field within a bank statement table that is previously empty. Further, another field that is also initially empty, the PAAType field is also filled. The BS 204 is then sent to an application 220 (e.g., SAP Cash Application) for LIM. However, if neither the CR LIM module 210 nor the CR CI module 212 are successful (e.g., the CR CI module 212 is unable to determine all customer IDs), the BS 204 is sent to the application 220 with both the PAA field and the PAAType field empty.

In some examples, the PAA field, even if populated, may not always be valid for determining the customer ID. Instead, the PAA is usable (valid) to predict the customer ID under the following conditions: the PAA field is not empty and is not equal to '*'; and the PAAType field is equal to 'D' to indicate a customer account (e.g., as opposed to K, which indicates a vendor account). However, even in instances where the PAA field is determined to be valid, the customer ID is not always directly determinable therefrom. For example, it can occur that a parent company is paying on behalf of a subsidiary. In such instances, the PAA can be different from the customer ID.

In view of this, the hybrid pipeline of the present disclosure includes a PAA lookup table. In some implementations, the PAA lookup table is generated during training. In some examples, the data is divided into a training data set and a validation data set. The training data set is used to build the lookup tables and to train the DL model. The look-up tables and the DL model are independently created. Once they are generated, the look-up tables and the DL model are provided as the pipeline, which is used to provide predictions on the validation data set. A performance of the pipeline can be assessed by assessing the amount of correct predictions that the pipeline is making. If the performance is satisfactory, we can use the pipeline in production.

In further detail, during training, matching relations between bank statements and invoices are known. That is, for example, training data is used, which training data provides instances of known matches between bank statements and invoices. In view of this, a mapping is generated between the PAA field (part of the bank statement table) and a receivable account ID field (part of the receivable table). In some examples, the bank statement table is made up of multiple bank statements and is provided as a table, in which row corresponds to a bank statement and each column corresponds to a field of the bank statement. In some examples, an invoice is also referred to as a receivable. The receivable table is made up of multiple invoices, where a row is an invoice and each column corresponds to a field/feature of the invoice. In some examples, a PAA value can be associated with multiple customer IDs. For instance, in some scenarios a parent company can provide payment for multiple subsidiaries at the same time.

In accordance with implementations of the present disclosure, the PAA lookup table is a dictionary, in which the keys are the PAA values and the values are associated lists of customer IDs. In some implementations, the PAA lookup table can be provided as:

| Example PAA Lookup Table Format |
| --- |
| $\text{PaymentAdviceAccountLookup} = \{\text{PAAValue}_1 : [\text{CustomerID}_1^1, \text{CustomerID}_2^1, \ldots, \text{CustomerID}_{n_1}^1],$ $\text{PAAValue}_2 : [\text{CustomerID}_1^2, \text{CustomerID}_2^2, \ldots, \text{CustomerID}_{n_1}^2],$ $\ldots$ $\text{PAAValue}_m : [\text{CustomerID}_1^m, \text{CustomerID}_2^m, \ldots, \text{CustomerID}_{n_m}^m]\}$ |

Further, and as introduced above, the hybrid pipeline of the present disclosure provides a customer lookup table. For example, bank statements contain bank account information. Payments associated with the same receivable account ID will come from the same bank account. In other words, two bank statements coming from the same bank account will be linked to the same customer ID. Implementations of the present disclosure leverage this to create the customer lookup table.

In further detail, the following fields are used to identify the bank account: Bank IBAN, Bank SWIFT Code, Bank Country Key, Bank Number, Bank Account Number, Business Partner Name, and/or Company Code. In some implementations, during training, these fields are concatenated and hashed (e.g., using SHA-256) to keep the sensitive information anonymous. A mapping is created between the hash and the associated customer IDs. Accordingly, the resulting customer lookup table is a dictionary, in which the keys are the hashes of the concatenation of the fields, and the values are lists of the corresponding customer IDs. In some implementations, the customer lookup table can be provided as:

| Example Customer Lookup Table Format |
| --- |
| $\text{CustomerLookup} = \{\text{hash}_{SHA-256}(\text{concat}(b_1^1, b_2^1, b_3^1, b_4^1, b_5^1, b_6^1, b_7^1)) : [\text{CustomerID}_1^1, \ldots, \text{CustomerID}_{i_1}^1],$ $\text{hash}_{SHA-256}(\text{concat}(b_1^2, b_2^2, b_3^2, b_4^2, b_5^2, b_6^2, b_7^2)) : [\text{CustomerID}_1^2, \ldots, \text{CustomerID}_{i_2}^2],$ $\ldots$ $\text{hash}_{SHA-256}(\text{concat}(b_1^k, b_2^k, b_3^k, b_4^k, b_5^k, b_6^k, b_7^k)) : [\text{CustomerID}_1^k, \ldots, \text{CustomerID}_{i_k}^k]\}$ |

As also introduced above, the hybrid pipeline of the present disclosure also includes a DL model. In accordance with implementations of the present disclosure, the DL model leverages text information provided from the bank statement memoline to predict the customer ID. The DL model is described in further detail below with reference to FIG. 3.

Figure 3:
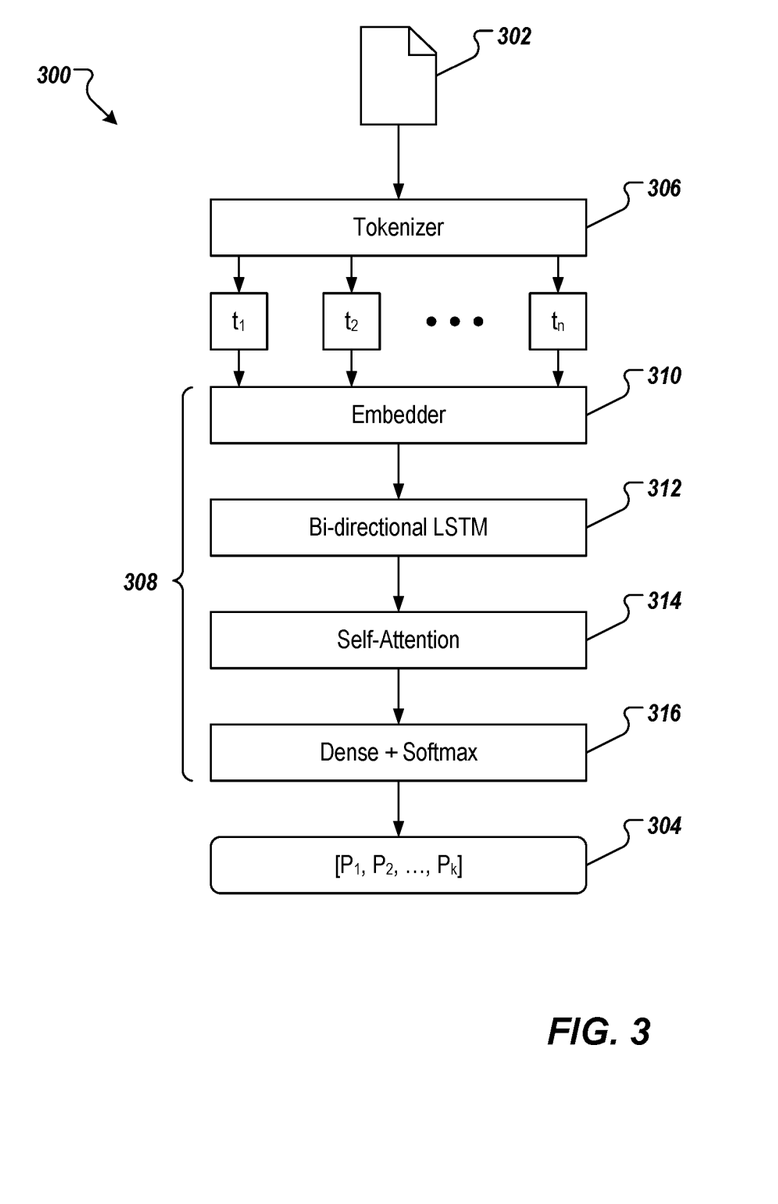
FIG. 3 depicts an example conceptual architecture in accordance with implementations of the present disclosure.

FIG. 3 depicts an example conceptual architecture 300 in accordance with implementations of the present disclosure. In the depicted example, a bank statement 302 is processed to provide a set of predicted customer IDs 304 (e.g., $[P_1, P_2, \ldots, P_k]$). More particularly, the bank statement 302 is processed through a tokenizer 306 to provide a set of tokens (e.g., $[t_1, t_2, \ldots, t_n]$) that are processed through a DL model 308. In some implementations, the tokenizer 306 preprocesses the memoline of the bank statement 302 by splitting a text into smaller pieces, referred to as tokens. In some examples, tokenization includes replacing special characters with spaces, dividing digits and alphabetic characters when they are part of the same string, and providing tokens based on spaces.

For example, example text of a memoline can be provided as:

Text in # the 5577Memoline

By replacing special characters with spaces, the example text becomes:

Text in the 5577Memoline

By dividing digits and alphabetic characters, the example text becomes:

Text in the 5577 Memoline

By providing tokens based on spaces, a set of tokens is provided as:

[Text, in, the, 5577, Memoline]

In accordance with implementations of the present disclosure, the set of tokens is processed through the DL model 308 to provide the set of predicted customer IDs 304. In the example of FIG. 3, the DL model 308 includes an embedding layer 310, a bi-directional long short-term memory (LSTM) layer 312, an attention layer 314, and a dense/softmax layer 316.

In some examples, the embedding layer 310 takes the result of the tokenization (i.e., the set of tokens), and maps discrete, categorical variables to a vector of continuous numbers. In some examples, the optimizer used is Adam with an initial learning rate of 0.01. In some examples, the embedding size for the embedder is 100. Here, each unique token in the set of tokens is provided as a categorical variable. In some examples, the bi-directional LSTM layer 312 captures token ordering in both a forward direction and a backward direction and is able to capture features of n-grams. In some examples, the bidierictional LSTM is made up of 256 units. In some examples, a batch size of 64 is used. In some examples, the attention layer 314 focuses on the tokens of the memoline that are most relevant. An example attention mechanism includes, without limitation, the Scaled Dot-Product Attention described in "Attention is All You Need" by Vaswani et al., 31st Conference on Neural Information Processing Systems (NIPS 2017), Long Beach, CA, USA. In some examples, the dense/softmax layer, which can be provided as a separate dense layer and a separate softmax layer) provides confidence scores for a set of predicted customer IDs (e.g., one or more customer IDs) provided from the attention layer 314. Each confidence level is associated with a respective customer ID. In some examples, the memoline is read and its side is fixed to 120 words. If there are fewer than 120 words, the memoline is padded until 120 words are achieved. If we have more, only the first 120 words are kept.

Figure 4:
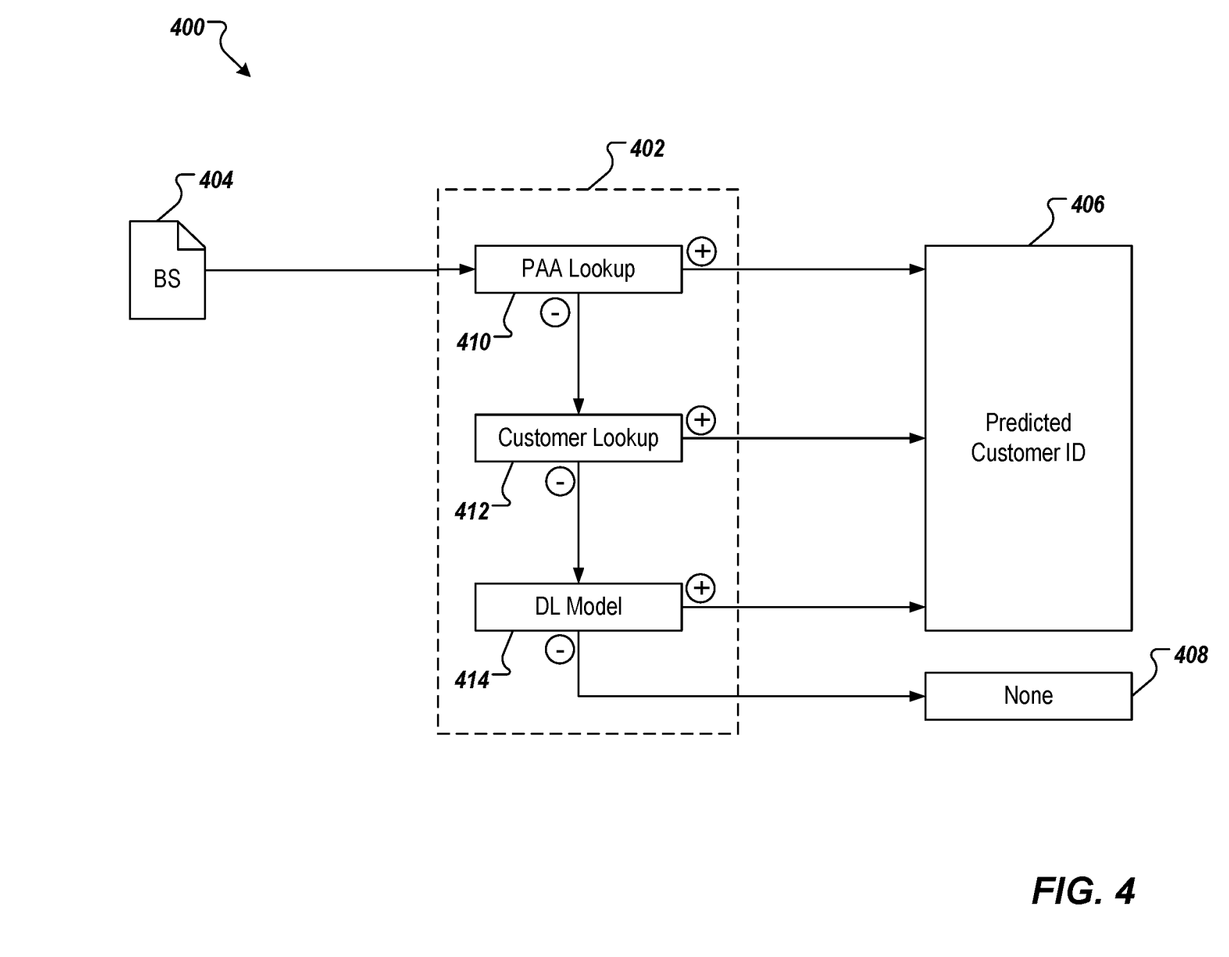
FIG. 4 depicts an example conceptual architecture in accordance with implementations of the present disclosure.

FIG. 4 depicts an example conceptual architecture 400 including a hybrid pipeline 402 in accordance with implementations of the present disclosure. In the depicted example, the hybrid pipeline 402 processes a bank statement (BS) 404 to determine either a predicted customer ID 406, or an empty value 408. As described herein, the hybrid pipeline includes a PAA lookup module 410, a customer lookup module 412, and a DL model 414.

In some implementations, the PAA lookup module 410 processes data provided in the BS 404 and provides the data as input to a PAA lookup table in an effort to determine a customer ID. More particularly, if the BS 404 includes a PAA value in a PAA field, the PAA value might be used as a key to the PAA lookup table. For example, and as described above, it is determined whether the PAA value is valid (e.g., the PAA field is not empty and is not equal to '*'; and the PAAType field is equal to 'D'). If the PAA value is valid it is used as a key to the PAA lookup table. If the PAA value is present in the PAA lookup table, the set of customer IDs (e.g., including one or more customer IDs) associated with the PAA value is output as the predicted customer ID 406.

If, however, the BS 404 does not include a PAA value, the PAA value is not valid, or the PAA value is absent from the PAA lookup table, the BS 404 is provided to the customer lookup module 412. In some implementations, the customer lookup module 412 processes data provided in the BS 404 and provides the data as input to a customer lookup table in an effort to determine a customer ID. More particularly, values of the BS 404 are concatenated and hashed to provide a key value that is used as input to the customer lookup table. For example, respective values of two or more of Bank IBAN, Bank SWIFT Code, Bank Country Key, Bank Number, Bank Account Number, Business Partner Name, and Company Code are concatenated and hashed (e.g., using SHA-256) to provide the key value. If the key value is present in the customer lookup table, the set of customer IDs (e.g., including one or more customer IDs) associated with the key value is output as the predicted customer ID 406. If, however, the key value is absent from the customer lookup table, the BS 404 is provided to the DL model module 414.

In some implementations, the DL model module 414 preprocesses text of the memoline of the BS 404 to provide a set of tokens, as described above with reference to FIG. 3. The set of tokens are processed through the DL model (the DL model 308 of FIG. 3) to generate a set of predicted customer IDs. In some examples, the set of predicted customer IDs includes one or more predicted customer IDs, each predicted customer ID having a confidence score assigned thereto. Each confidence score represents a relative confidence in a respective prediction. In some examples, each confidence score is compared to a threshold confidence score. If no confidence score exceeds the threshold confidence score, it is determined that the DL model was unable to predict the customer ID, and an empty value is output. If a single confidence score exceeds the threshold, the respective customer ID is output as the predicted customer ID. In some examples, if multiple confidence scores exceed the threshold, the respective customer IDs are provided as the predicted customer ID. In some examples, if multiple confidence scores exceed the threshold, a customer ID having the highest confidence score is provided as the predicted customer ID.

Figure 5:
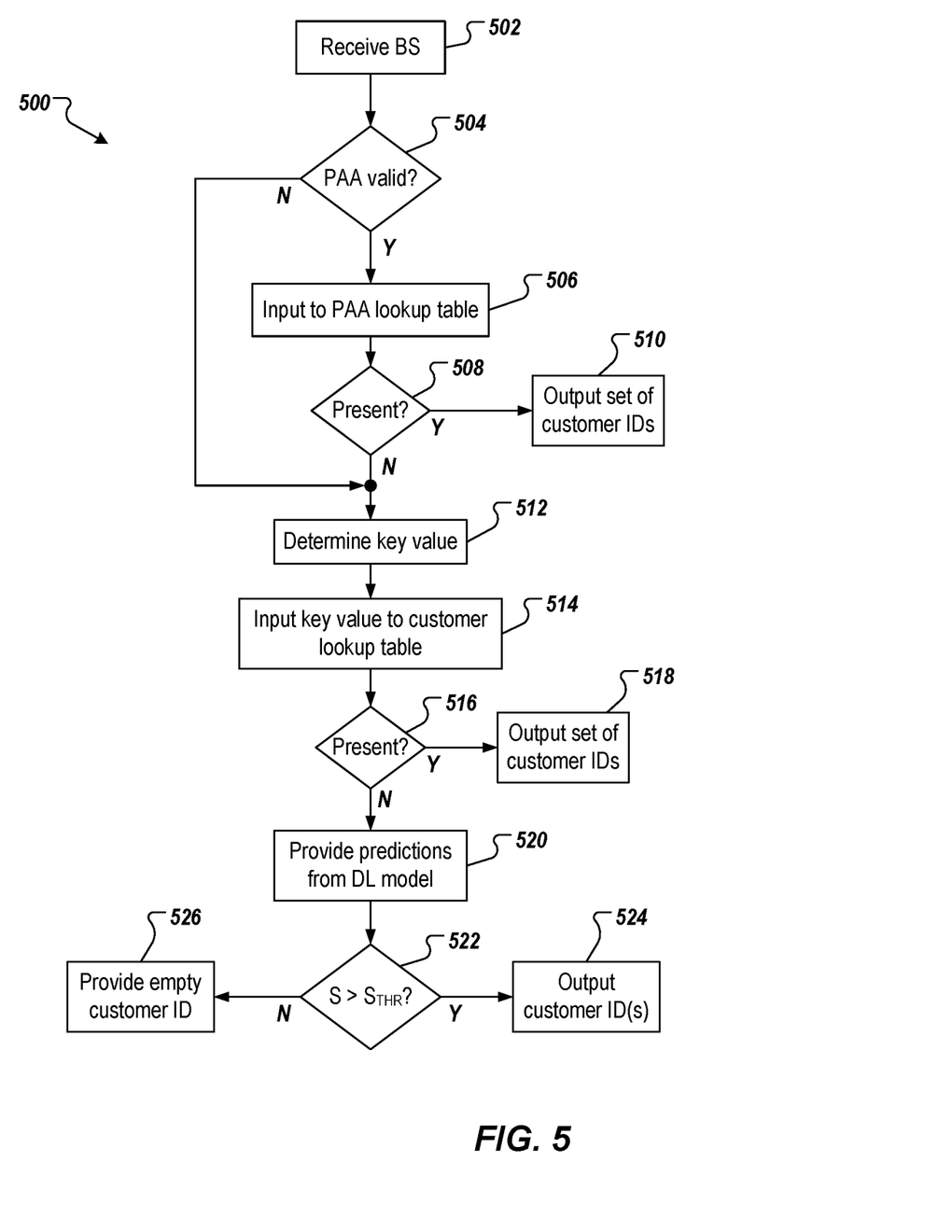
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A bank statement is received (502). For example, and with reference to FIG. 4, the BS 404 is received by the hybrid pipeline 402. It is determined whether a PAA value is valid (504). For example, the hybrid pipeline 402 determines whether the PAA field is not empty and is not equal to '*', and whether the PAAType field is equal to 'D'. In some examples, the PAA lookup module 410 can receive the BS 404 and determine whether the PAA value is valid. If the PAA value is not valid, the example process 500 loops forward.

If the PAA value is valid, the PAA value is provided as input to a PAA lookup table (506), and it is determined whether the PAA value is present in the PAA lookup table (508). For example, the PAA value is provided as a key to the PAA lookup table. If the PAA value is present in the PAA lookup table, a set of customer IDs is output (510). For example, the set of customer IDs (e.g., one or more customer IDs) that is associated with the PAA value in the PAA lookup table is provided as output.

If the PAA value is not present in the PAA lookup table, a key value is determined (512). For example, respective values of two or more of Bank IBAN, Bank SWIFT Code, Bank Country Key, Bank Number, Bank Account Number, Business Partner Name, and Company Code are concatenated and hashed (e.g., using SHA-256) to provide the key value. The key value is input to a customer lookup table (514), and it is determined whether the key value is present in the customer lookup table (516). If the key value is present in the customer lookup table, a set of customer IDs is output (518). For example, the set of customer IDs (e.g., one or more customer IDs) that is associated with the key value in the customer lookup table is provided as output.

If the key value is not present in the customer lookup table, a set of predicted customer IDs is provided from a DL model (520). For example, the DL model module 414 preprocesses text of the memoline of the BS 404 to provide a set of tokens, as described above with reference to FIG. 3. The set of tokens are processed through the DL model (the DL model 308 of FIG. 3) to generate a set of predicted customer IDs. In some examples, the set of predicted customer IDs includes one or more predicted customer IDs, each predicted customer ID having a confidence score (S) assigned thereto.

It is determined whether at least one confidence score (S) exceeds a threshold confidence score ($S_{THR}$) (522), and if the at least one confidence score (S) exceeds the threshold confidence score ($S_{THR}$), one or more customer IDs are output (524). In some examples, each confidence score is compared to the threshold confidence score. If a single confidence score exceeds the threshold, the respective customer ID is output as the predicted customer ID. In some examples, if multiple confidence scores exceed the threshold, the respective customer IDs are provided as the predicted customer ID. In some examples, if multiple confidence scores exceed the threshold, a customer ID having the highest confidence score is provided as the predicted customer ID. If at least one confidence score (S) does not exceed the threshold confidence score ($S_{THR}$), an empty customer ID is output (526).

Figure 6:
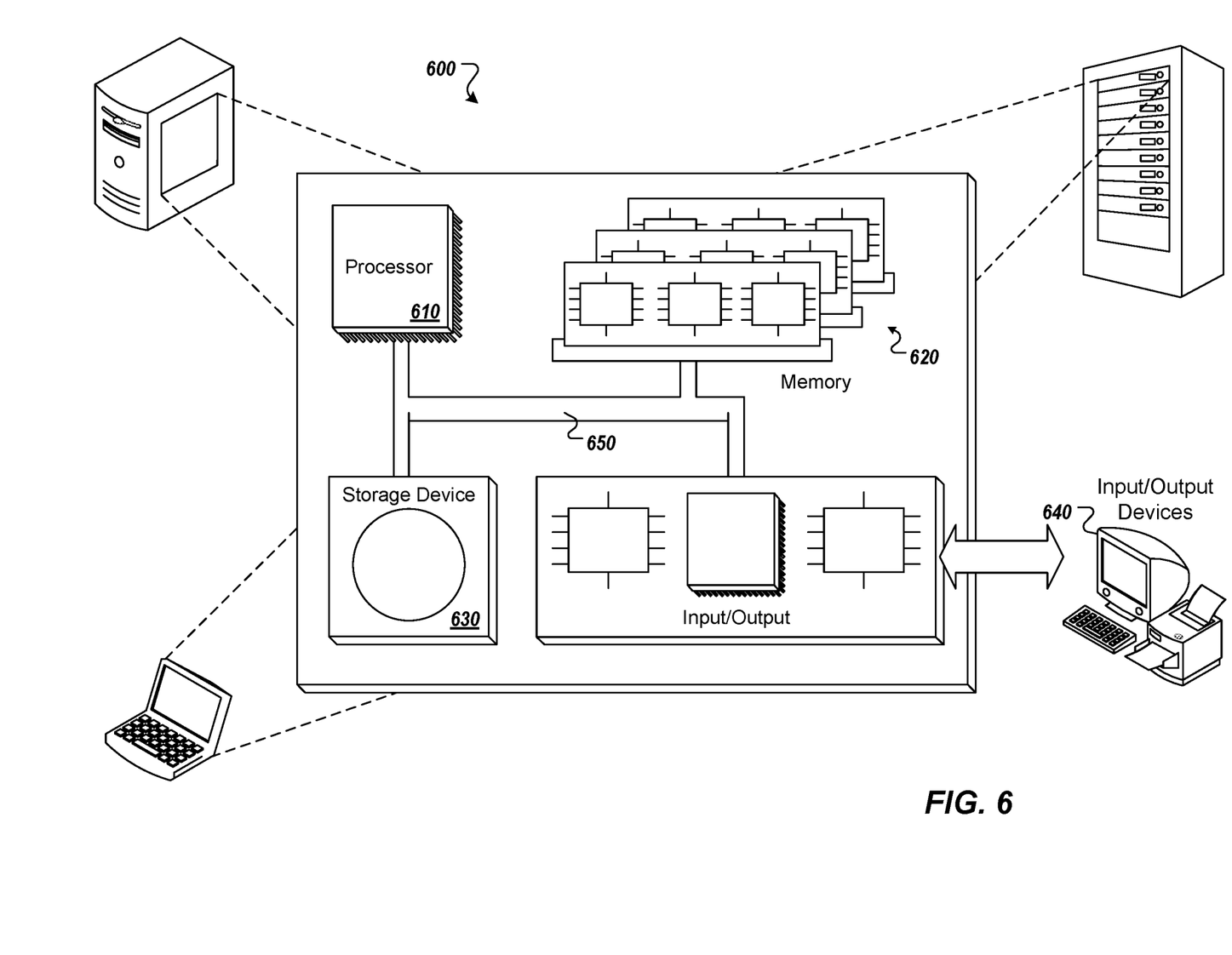
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining customer identifiers (IDs) from bank statements provided as computer-readable electronic documents, the method being executed by one or more processors and comprising:
receiving a first bank statement at a hybrid pipeline comprising a set of lookup tables and a deep learning (DL) model that can each be used to determine customer IDs from bank statements;
providing a first key based on data associated with the first bank statement, the first key comprising a hash value determined for a concatenation of the data; and
determining that the first key is included in a first lookup table of the set of lookup tables, and in response:
identifying a first set of customer IDs from the first lookup table, the customer lookup table mapping hash values to customer IDs, the first set of customer IDs comprising one or more customer IDs, and
outputting the first set of customer IDs to computer-executable software that matches the first bank statement to one or more electronic documents at least partially based on the first set of customer IDs.

2. The method of claim 1, wherein the first key is compared to values of the first lookup table in response to determining that a value of the first key is valid.

3. The method of claim 1, wherein the first key comprises a payment advice account (PAA) value, and the first lookup table comprises a PAA lookup table that records PAA value and set of customer IDs pairs.

4. The method of claim 1, further comprising:
receiving a second bank statement at the hybrid pipeline;
providing a second key based on data associated with the second bank statement; and
determining that the second key is included in a second lookup table of the set of lookup tables, and in response:
identifying a second set of customer IDs from the second lookup table, the second set of customer IDs comprising one or more customer IDs, and
outputting the second set of customer IDs to the computer-executable software that matches the second bank statement to one or more electronic documents at least partially based on the second set of customer IDs.

5. The method of claim 1, wherein the second key is provided in response to determining that a key that is provided based on data associated with the second bank statement is one of invalid and absent from the first lookup table.

6. The method of claim 1, further comprising:
receiving a second bank statement at the hybrid pipeline;
processing a memoline of the second bank statement using the DL model to provide a second set of customer IDs, the second set of customer IDs comprising one or more customer IDs; and
outputting the second set of customer IDs to the computer-executable software that matches the second bank statement to one or more electronic documents at least partially based on the second set of customer IDs.

7. The method of claim 6, wherein the memoline of the second bank statement is processed by the DL model in response to determining that customer IDs for the second bank statement cannot be determined from any lookup tables in the set of lookup tables.

8. A non-transitory computer-readable storage medium coupled to one or more processors and having instructions stored thereon which, when executed by the one or more processors, cause the one or more processors to perform operations for determining at least one customer identifier (ID) from a bank statement provided as a computer-readable electronic document, the operations comprising:
receiving a first bank statement at a hybrid pipeline comprising a set of lookup tables and a deep learning (DL) model that can each be used to determine customer IDs from bank statements;
providing a first key based on data associated with the first bank statement, the first key comprising a hash value determined for a concatenation of the data; and
determining that the first key is included in a first lookup table of the set of lookup tables, and in response:
identifying a first set of customer IDs from the first lookup table, the customer lookup table mapping hash values to customer IDs, the first set of customer IDs comprising one or more customer IDs, and outputting the first set of customer IDs to computer-executable software that matches the first bank statement to one or more electronic documents at least partially based on the first set of customer IDs.

9. The computer-readable storage medium of claim 8, wherein the first key is compared to values of the first lookup table in response to determining that a value of the first key is valid.

10. The computer-readable storage medium of claim 8, wherein the first key comprises a payment advice account (PAA) value, and the first lookup table comprises a PAA lookup table that records PAA value and set of customer IDs pairs.

11. The computer-readable storage medium of claim 8, wherein operations further comprise:
receiving a second bank statement at the hybrid pipeline;
providing a second key based on data associated with the second bank statement; and
determining that the second key is included in a second lookup table of the set of lookup tables, and in response:
identifying a second set of customer IDs from the second lookup table, the second set of customer IDs comprising one or more customer IDs, and
outputting the second set of customer IDs to the computer-executable software that matches the second bank statement to one or more electronic documents at least partially based on the second set of customer IDs.

12. The computer-readable storage medium of claim 8, wherein the second key is provided in response to determining that a key that is provided based on data associated with the second bank statement is one of invalid and absent from the first lookup table.

13. The computer-readable storage medium of claim 8, wherein operations further comprise:
receiving a second bank statement at the hybrid pipeline;
processing a memoline of the second bank statement using the DL model to provide a second set of customer IDs, the second set of customer IDs comprising one or more customer IDs; and
outputting the second set of customer IDs to the computer-executable software that matches the second bank statement to one or more electronic documents at least partially based on the second set of customer IDs.

14. The computer-readable storage medium of claim 13, wherein the memoline of the second bank statement is processed by the DL model in response to determining that customer IDs for the second bank statement cannot be determined from any lookup tables in the set of lookup tables.

15. A system, comprising:
a computing device; and
a computer-readable storage device coupled to the computing device and having instructions stored thereon which, when executed by the computing device, cause the computing device to perform operations for determining at least one customer identifier (ID) from a bank statement provided as a computer-readable electronic document, the operations comprising:
receiving a first bank statement at a hybrid pipeline comprising a set of lookup tables and a deep learning (DL) model that can each be used to determine customer IDs from bank statements;
providing a first key based on data associated with the first bank statement, the first key comprising a hash value determined for a concatenation of the data; and
determining that the first key is included in a first lookup table of the set of lookup tables, and in response:
identifying a first set of customer IDs from the first lookup table, the customer lookup table mapping hash values to customer IDs, the first set of customer IDs comprising one or more customer IDs, and
outputting the first set of customer IDs to computer-executable software that matches the first bank statement to one or more electronic documents at least partially based on the first set of customer IDs.

16. The system of claim 15, wherein the first key is compared to values of the first lookup table in response to determining that a value of the first key is valid.

17. The system of claim 15, wherein the first key comprises a payment advice account (PAA) value, and the first lookup table comprises a PAA lookup table that records PAA value and set of customer IDs pairs.

18. The system of claim 15, wherein operations further comprise:
receiving a second bank statement at the hybrid pipeline;
providing a second key based on data associated with the second bank statement; and
determining that the second key is included in a second lookup table of the set of lookup tables, and in response:
identifying a second set of customer IDs from the second lookup table, the second set of customer IDs comprising one or more customer IDs, and
outputting the second set of customer IDs to the computer-executable software that matches the second bank statement to one or more electronic documents at least partially based on the second set of customer IDs.

19. The system of claim 15, wherein the second key is provided in response to determining that a key that is provided based on data associated with the second bank statement is one of invalid and absent from the first lookup table.

20. The system of claim 15, wherein operations further comprise:
receiving a second bank statement at the hybrid pipeline;
processing a memoline of the second bank statement using the DL model to provide a second set of customer IDs, the second set of customer IDs comprising one or more customer IDs; and
outputting the second set of customer IDs to the computer-executable software that matches the second bank statement to one or more electronic documents at least partially based on the second set of customer IDs.

* * * * *